Figure 1:
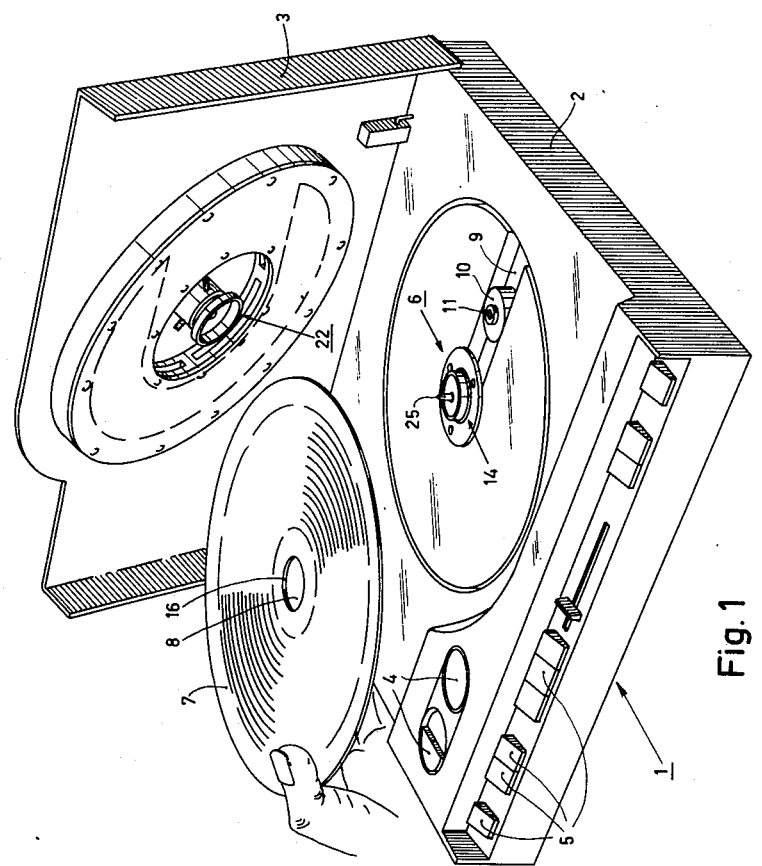

United States Patent [19]
Camerik et al.

[11] 3,980,308
[45] Sept. 14, 1976

[54] CLAMPING DEVICE FOR A ROTATABLE INFORMATION-CARRYING RECORD

[75] Inventors: Eduard Camerik; Johannus Alphonsus Hendrikus Siteur, both of Eindhoven, Netherlands

[73] Assignee: U.S. Philips Corporation, New York, N.Y.

[22] Filed: June 5, 1975

[21] Appl. No.: 583,988

[30] Foreign Application Priority Data
Mar. 10, 1975 Netherlands............... 7502804

[52] U.S. Cl. .................... 274/9 R; 178/6.6 DD; 274/39 A; 346/137; 360/86
[51] Int. Cl.² ................ G01D 15/32; G11B 25/04
[58] Field of Search ............... 274/9 R, 9 B, 39 R, 274/39 A, 41.6 R, 41.6 A, 42 R; 360/97, 99, 86; 178/6.6 R, 6.6 DD, 6.7 A, 1.3 B; 346/137

[56] References Cited
UNITED STATES PATENTS

| | | | |
|---|---|---|---|
| 2,634,134 | 4/1953 | Dietz.................................. | 274/9 R |
| 2,943,861 | 7/1960 | Redfield............................. | 274/9 R |
| 3,071,381 | 1/1963 | Schneider.......................... | 274/39 R |
| 3,784,853 | 1/1974 | Wangsness......................... | 274/39 R |
| 3,891,796 | 6/1975 | Takahara et al.............. | 178/6.6 DD |

Primary Examiner—Richard E. Aegerter
Assistant Examiner—Steven L. Stephan
Attorney, Agent, or Firm—Frank R. Trifari; Simon L. Cohen

[57] ABSTRACT

A clamping device for rotatably driving an information carrying record such as a rigid or flexible video record and comprising a drive spindle, a record support disposed thereon, a substantially conical centring member having a diameter which varies from a diameter smaller than to greater than that of the record hole, which also during operation co-operates with the edge of the central hole in the record, and furthermore resilient pressure means for pressing the centring surface and the edge of the central hole in the record against each other. The centring member is rigidly connected to the record support, while the part of the centring surface which co-operates with the record hole is disposed at some axial distance from other parts of the record support and a resilient record loading device is provided which during operation bears on the record and is movable opposite to centring member for pressing the edge of the record against the centring surface, so that during starting the record can tilt into a plane which is perfectly perpendicular to the axis of rotation of the drive spindle under the influence of the centrifugal forces acting on it.

8 Claims, 6 Drawing Figures

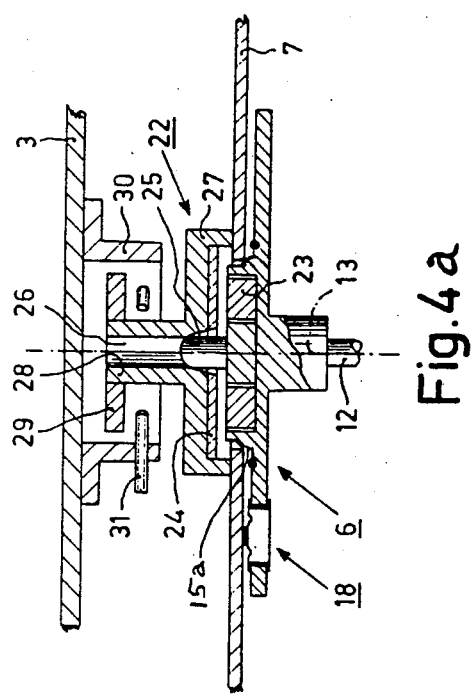

CLAMPING DEVICE FOR A ROTATABLE INFORMATION-CARRYING RECORD

The invention relates to a clamping device for clamping a disc-shaped information-carrying record onto a rotatable drive spindle, which record is rotatable with the aid of a spindle and which is provided with a central hole, such as a rigid or flexible video record which is made of a foil, the device comprising: a drive spindle, a record support which is fixed to the drive spindle, a means for centering the record relative to the axis of the drive spindle, which means comprises a centering member which has a centering surface whose diameter varies from smaller than that of the record hole to greater than that of the record hole, which also during operation co-operates with the edge of the central hole in the record, and resilient pressure means for pressing the centering surface and the edge of the central hole in the record against each other.

In a known dictating machine with a clamping device of this type the record support consists of a rotatable platter which at the location of the central opening of the record is provided with a cylindrical recess which corresponds to the central hole in respect of diameter. The centering device has the shape of a conical record loading device, which in the direction of the axis of the drive spindle can be moved in an axial direction with the aid of means provided for this purpose in the dictating machine. The record is positioned on the platter, after which the conical record loading device is lowered with the aid of said means, the conical surface coming into contact with the edge of the central opening of the record and the cone being lowered into the central recess in the platter over a small distance. When the conical record loading device is fully lowered, said device becomes slightly disengaged from the said device for moving it up and down, but via a rotating pivot ball the record loading device remains in contact with a pressure spring which keeps the conical surface of the record loading device pressed against the edge of the record (U.S. Pat. No. 2,634,134).

For certain applications this known clamping device is not suitable. This applies in particular to applications where the record has a comparatively high speed and should move very accurately relative to specific reading means which read the information contained on the record. This is specifically so with video record players which read the information on the record by means of a light beam which is reflected by the record, the read unit being located underneath the record. With such an application a platter of a diameter equal to that of the record which supports the record is not suitable, because the light beam could not reach the record. Another drawback of the known device is that the record can only be positioned on the drive spindle by means of a comparatively complex operation. Indeed, prior to this a comparatively good alignment of the central hole of the record relative to the center of the drive spindle is required. Furthermore, the conical record loading device keeps the record in engagement with the platter, so that the position of the surface of the record at any instant is determined by the position of the platter surface disposed underneath it. This means that when it is desirable that the record surface moves very accurately in a specific plane during playing, the platter and the drive spindle must be manufactured with very high accuracy. A further drawback of the known device is that for engagement of the conical record loading device during operation the record loading device and fixed parts of the apparatus should remain in frictional contact to transmit the pressure force of the spring. Said pressure force is then also transmitted to the drive spindle bearing via the record, the platter and the drive spindle.

It is an object of the invention to provide a clamping device of the type mentioned in the preamble which mitigates said drawbacks and which is in particular suitable for use in a video record player. The invention is characterized in that the centering member is rigidly connected to and forms a part of the record support, that the part of the centering surface which has a diameter equal to that of a record hole is disposed at some axial distance from other parts of the record support, so that a rigid record which is fitted can be tilted freely on the centering device to a limited extent, and that a resiliently loaded record loading device is provided, which during operation bears on a record and which is movable to a position opposite the centering member, for pressing the edge of the record hole against the centering surface.

Positioning of a record on the drive spindle is substantially simplified by the invention and does not differ from positioning a gramophone record on the turntable of a gramophone. The record should merely be positioned with its opening on the upwardly extending centering device, upon which the record may assume a slightly oblique position owing to the clearance between the centering surface and the other parts of the record support which are located at some distance therefrom. However, an essential feature of the invention is that after the drive spindle has been put into motion the record automatically assumes a position which is precisely transverse to the axis of the drive spindle under the influence of the centrifugal forces which act on the record. The centering surface may form a part of the surface of a sphere.

It is advantageous if the record loading device and the record support are provided with mutually co-operating record-loading device positioning means for positioning the record loading device relative to the rotation axis of the drive spindle and comprising a projection which is co-axial with the axis of the drive spindle on one of the co-operating components and a corresponding cavity in the other component.

The record player is generally provided with a cover which during operation covers the record, because the video record will have a rotational velocity of 1500 or 1800 revolutions per minute. An embodiment of a clamping device which is suited for use in a video player is characterized in that the record loading device substantially consists of a rotatable ring. During loading the ring is rotatably connected to the cover, but in the operating condition the ring is entirely clear of the cover. The ring and the record support are provided with co-operating magnetic pressure means which comprises at least one permanent magnet. A major advantage of this embodiment is that the pressure force is produced directly between the drive spindle and the record loading device, so that no springs which are connected to stationary parts of the machine are necessary, which must be isolated from the rotary parts by means of a pivot. Hence, no axial forces will be exerted on the drive spindle bearing.

As was previously explained, it is of importance that during starting the record can be tilted relative to the axis of the drive spindle. The frictional forces between the edge of the hole of the record and the centering surface therefore need not be great, which means that an embodiment is of significance in which the drive torque for driving the record need not be provided exclusively by the friction which exists between the edge of the hole and the centering surface, and is characterized in that on the record support at least one record carrying member is provided for carrying a rigid record in the direction of rotation and comprising a friction block which co-operates with a record and which is movable in the direction of the axis of the spindle, as well as resilient means for pressing the friction block against the record, and the record carrying member is located at a greater distance from the axis of the drive spindle than the parts of the centering member. In this respect it is advantageous for reasons of pricing and manufacturing technology, if the resilient means and the friction block form part of a record carrying member which consists of one unit and is made of an elastic material. In addition to the friction block, the record carrying member comprises an annular part which surrounds said block concentrically, and a flexible connecting part which connects the friction block to the annular part.

The embodiment described above is not suited in the case in which the record consists of a foil which is provided with information. An embodiment which is suitable for driving thin flexible records is characterized in that on the record support at least one record carrying member is provided for driving a flexible record in the direction of rotation and consisting of a carrying ring of deformable material. The carrying ring has a diameter greater than the part of the centering surface of the greatest diameter, and the pressure-transmitting parts of the record loading device are disposed at a diameter which is substantially equal to that of the carrying ring. Practice has shown that when flexible foils are used with a central hole of 35 mm it is of importance when the carrying ring has a diameter of approximately 40 mm.

Figure 2:
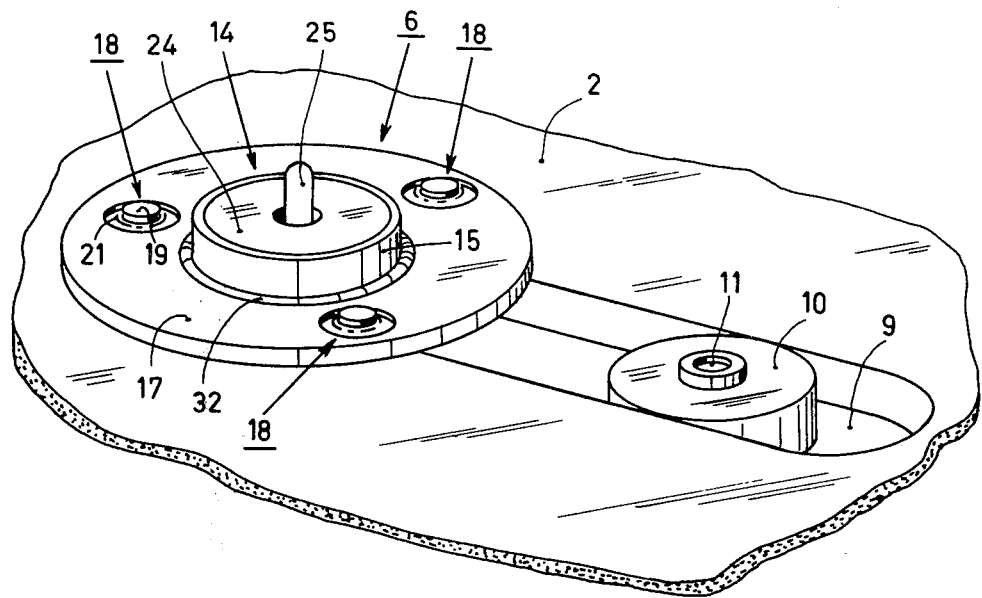
Figure 3:
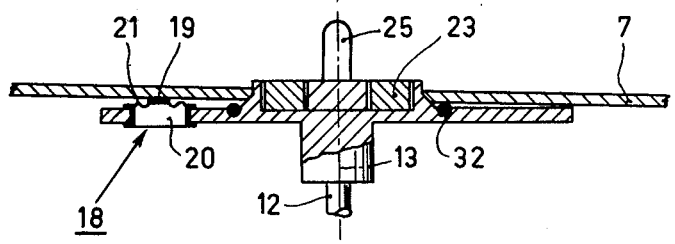
Figure 4:
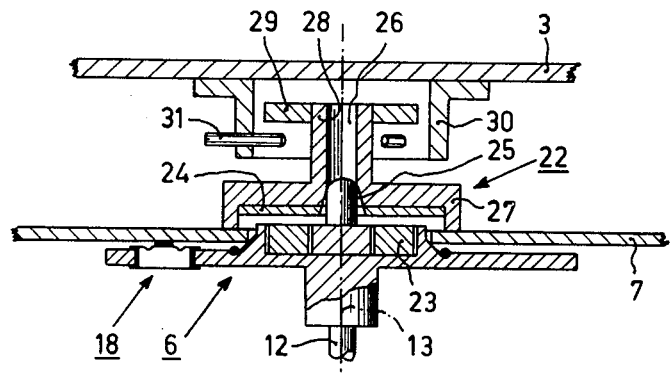
Figure 5:
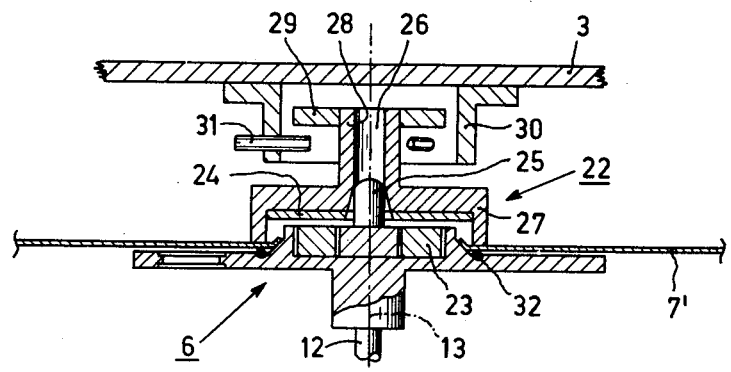

The invention will now be described in more detail with reference to the drawing in which FIG. 1 shows a perspective view of a video player with a raised cover, FIG. 2 is a scaled-up perspective view of the record support and the part immediately surrounding it, FIG. 3 is a view, partly in cross-section, of the record support with a record positioned on it, FIG. 4 is a view in accordance with FIG. 3, but now during operation and with the cover closed, FIG. 4a is a view similar to FIG. 4 but showing a generally spherical centering surface, and FIG. 5 shows a similar view as in FIG. 4, but now with a flexible record instead of a rigid record.

The video player 1 of FIG. 1 comprises a housing 2 and a hinged cover 3. At the front of the housing a number of buttons 4 and 5 are provided for the actuation of the various functions of the apparatus. Substantially in the center at the top of the housing a record support 6 is disposed which forms a part of a clamping device for the rotary drive of a video record 7 with a central hole 8. Beside the record support 6 a radially extending slot 9 is formed in the upper surface of the housing 2, in which a focussing device 10 can be moved in a radial direction with the aid of means (not shown) accommodated in the housing 2. It is provided with an objective 11 with which a light beam from a laser source (not shown) can be projected onto the underside of the record 7 and the light which is reflected by the record can be returned to photoelectric information detection means.

As can be seen more easily in FIG. 2, the record support 6 which is rigidly mounted on a drive spindle 12 which is shown in FIGS. 2 through 5, means for centering the record 7 relative to the axis 7 of the drive spindle, which means comprises a centering member 14 which has a centering surface 15 whose diameter varies from greater to smaller than the record hole 8. The centering surface 15, as will be discussed hereinafter with reference to FIGS. 4 and 5, co-operates with the edge 16 of the record hole. During operation the edge of the hole in the record is pressed against the centering surface 15 by resilient pressure means which will also be discussed hereinafter. In the embodiment shown in the drawing the centering surface has the shape of a section of a truncated cone.

The centering member 14 is rigidly connected to and forms a part of the record support 6. The portion of the centering surface 15 which has a diameter equal to that of the record hole is disposed at some axial distance from the other fixed parts of the record support, so that a rigid record 7 which is positioned on the apparatus can be tilted to a limited extent on the centering member. For this see in particular FIG. 3. Round the centering member 14 a small platter is located in the form of a flange 17. In this flange at the circumference three record carrying members 18 are disposed at equal distances, which serve for rotating a rigid record 7 and which have a friction block 19 which is movable in the axial direction of the spindle 12. The friction blocks 19 when the record is fitted are resiliently pressed against the underside of the record. The friction block 19 belongs to a record carrying member which consists of a single unit made of an elastic material, which apart from the friction block consists of a part 20 which concentrically surrounds said block and a flexible connecting part 21 which connects the friction block to the annular part, which part 21 serves for resiliently pressing the friction block 19 against the record. Thus, a component is obtained which can be manufactured very simply and which can readily be fitted in corresponding cylindrical openings in the flange 17.

The clamping device also includes a record loading device denoted by the reference numeral 22 in FIGS. 1, 4 and 5. During operation said device serves for pressing the edge 16 of the record hole 8 against the centering surface 15. For this purpose the centering member 14 and the record loading device 22 are provided with mutually co-operating resilient pressure means, which consist of an annular permanent magnet 23 disposed in the record support 6 and a soft-iron disc 24 which is disposed in the record loading device 22. Instead of a soft-iron disc it is evident that alternatively a second permanent magnet may be mounted in the record loading device 22, while it is also irrelevant for the invention whether the record support 6 includes a soft-iron disc and the record loading device 22 a permanent magnet.

The record loading device 22 and the record support 6 are provided with mutually co-operating record-loading-device positioning-means for positioning the record loading device relative to the axis of rotation 13 of the drive spindle 12, which means consist of projection 25 which is coaxial with the drive spindle 12 and corresponds to a cylindrical opening 26 in the record loading device. The last-mentioned device, see in particular FIGS. 4 and 5, consists of a rotatable ring 27 which connects loosely and rotatably with the cover 3, from which it is completely clear in the operating condition. For this purpose a cylindrical member 28 is attached to the ring 27 and is fronted with a flange 29 at its end. Said flange is located within a bushing 30 which is connected to the cover 3. Three screws 31 in the wall of the bushing 30 retain the flange 29 in the bush 30 when the cover is open.

The operation of the clamping device according to the invention is as follows. When the cover 3 is open the video record 7 is manually positioned on the record support 6, the edge 16 of the hole 8 of the record making contact with the centering surface 15 of the centring member 14. Generally the record will then be positioned slightly obliquely relative to the desired plane of rotation, which is perpendicular to the axis 13 of the spindle 12, which does not impede closure of the cover 3. By closing the cover 3 the record loading device 22 is positioned above the centering member and when the cover is fully closed the record loading device is magnetically pressed onto the record. The ample opening 26 in the record loading device co-operates with the locating pin 25 so that the record loading device is always positioned correctly. In this situation the record loading device 22 is no longer in contact with the bush 30 and the spindle 12 may now be driven. For this purpose the spindle is coupled to an electric drive motor in a manner not shown, which motor is equipped with electronic speed control. During starting the record 7 is automatically tilted owing to the centrifugal forces acting on it, into a plane which is perfectly perpendicular to the axis 13 of the spindle 12. The drive torque is then substantially transmitted by the friction blocks 19 so that the friction between the edge 16 of the hole 8 and the centering surface 15 does not prevent tilting of the record. After the record has been played and the cover 3 has been opened the record may be lifted off the record support 6.

FIG. 5 shows how a flexible record, which is designated by the reference numeral 7', is positioned on the record support 6. When flexible records are employed the record carrying members 18 are superfluous and instead a carrying ring 32 of a deformable material is used. This ring is an O-ring with a diameter which is greater than the part of greatest diameter of the centering surface 15 and equal to that of the carrying ring 27. The material of the flexible record 7' is slightly deformed by the centering surface 15 so that the record is correctly centered on the record support, while the drive torque for rotating the record is provided by the friction which occurs between the O-ring 32 and the record 7' under the influence of the pressure force exerted by the ring 27. In this respect it is of importance that the diameter of the O-ring bears a specific relation to the diameter of the hole in the record. In practice it has been found that for video records with a central hole of 35 mm the O-ring should preferably have a diameter of approximately 40 mm.

As shown in FIG. 4a the centering surface 15a may also be shaped as a spherical section.

What is claimed is:

1. A clamping device (6, 22) for clamping a disc-shaped information-carrying record (7) with a central hole (8) onto a rotatable drive spindle (12) with the aid of which it can be rotated, said clamping device being of the type comprising:

a drive spindle (12), a record support including a generally planar surface (6), which is rigidly mounted on the drive spindle, a means for centering the record (7) relative to the axis (13) of the drive spindle (12), which comprises a centering member (14) provided with a centering surface (15) whose diameter varies from smaller than to greater than the diameter of the record hole (8) which surface, also during operation, co-operates with the edge (16) of the central hole in the record, and resilient pressure means (23, 24) for pressing the centering surface (15) and the edge (16) of the central hole (8) in the record (7) against each other, the improvement, wherein the centering member (14) is rigidly connected to and forms a part of the record support (6), the part of the centering surface (15) which has a diameter equal to that of the record hole (8) is disposed at some axial distance from said planar surface of the record support, so that a rigid record (7) can be tilted to a limited extent on the centering member (14) for pressing the centering surface (15) against the edge (16) of the record hole (8).

2. A clamping device as claimed in claim 1, characterized in that the centering surface is a part of the surface of a sphere.

3. A clamping device as claimed in claim 1, wherein the record loading device (22) and the record support (6) are provided with mutually co-operating record-loading-device positioning-means, for positioning the record loading device relative to the axis (13) of rotation of the drive spindle (12) and comprising a projection which is co-axial with the axis of the drive spindle (12), on one of the cooperating components and a corresponding cavity in the other component.

4. A clamping device as claimed in claim 1 for a video player which is provided with a cover which covers the record during operation, wherein the record loading device (22) substantially comprises a rotatable ring (27), the ring is connected in a loosely rotatable fashion to the cover (3) but is completely clear thereof in the operating condition and the ring (22) and the record support (6) are provided with co-operating magnetic pressure means, comprising at least one permanent magnet (24).

5. A clamping device as claimed in claim 1, wherein on the record support (6) at least one record carrying member (18) is disposed for driving a rigid record (7) in the direction of rotation and comprising a friction block which co-operates with a record and which is movable in an axial direction of the spindle (12), as well as resilient means for pressing the friction block (19) against the record, and the record carrying means are disposed at a greater distance from the axis (13) of the drive spindle (12) than the parts of the centering member (14).

6. A clamping device as claimed in claim 5, wherein the resilient means and the friction block (19) belong to a record carrying member which consists of a single unit which is made of an elastic material, which apart from the friction block consists of an annular part (20) which concentrically surrounds said block and a flexible connecting part (21) which connects the friction block to the annular part.

7. A clamping device as claimed in claim 1, wherein on the record support (6) at least one record carrying member is disposed for driving a flexible record (7') in the direction of rotation and consisting of a carrying ring (31) of a deformable material, the carrying ring has a diameter which is greater than the part of the centering surface (15) which has the greatest diameter, and the pressure-transmitting parts of the record loading device (22) are disposed at a diameter which substantially equals that of the carrying ring (27).

8. A clamping device as claimed in claim 7, for flexible video record (7') with a central hole of 35 mm, wherein the carrying ring (27) has a diameter of approximately 40 mm.

* * * * *